United States Patent [19]
Trub et al.

[11] 3,810,725
[45] May 14, 1974

[54] APPARATUS FOR USE IN THE MANUFACTURE OF A TUBULAR FILM FROM PLASTIC MATERIAL

[75] Inventors: Jean Trub, Grand-Lancy, Geneve; Klaus Kneller, Nurensdorf; Jean-Francois Gregoire, Aire, Geneve, all of Switzerland

[73] Assignee: Schweizerische Industrie-Gesellschaft, Neuhausen am Rheinfall, Switzerland

[22] Filed: Sept. 26, 1972

[21] Appl. No.: 292,317

[30] Foreign Application Priority Data
Sept. 28, 1971 Switzerland................. 14149/71

[52] U.S. Cl.................. 425/72, 425/326 R, 264/95
[51] Int. Cl............................................. B29d 23/04
[58] Field of Search............. 425/72, 326 R; 264/95

[56] References Cited
UNITED STATES PATENTS

| | | | |
|---|---|---|---|
| 2,844,846 | 7/1958 | Kronholm | 425/326 R X |
| 3,296,343 | 1/1967 | Buttolph | 425/326 R X |
| 3,307,219 | 3/1967 | Bigland | 425/72 X |
| 3,329,999 | 7/1967 | Cook | 425/72 |
| 3,577,488 | 5/1971 | Bigland | 425/72 X |

FOREIGN PATENTS OR APPLICATIONS

| | | | |
|---|---|---|---|
| 1,391,562 | 1/1965 | France | 425/326 R |
| 1,074,459 | 7/1967 | Great Britain | 425/326 R |

Primary Examiner—R. Spencer Annear
Attorney, Agent, or Firm—Eric H. Waters

[57] ABSTRACT

An apparatus for simultaneously inflating and cooling a melt extruded tube passing between a die orifice and a pair of rolls for flattening the thus radially distended tube. At least one nozzle for supply of air is mounted on a tubular conduit which projects forwardly of the die and coaxially with the extrusion axis thereof and one end of which is connected to a source of air under pressure. The nozzle is secured to the tubular conduit in such a manner that it can be located in a first withdrawn position permitting the unhindered passage thereover of the tube as it leaves the die, and in a second position adjacent the inner surface of the tube as expanded. The nozzle will be in the first position at the commencement of operation before the extruded tube is taken up by the flattening rolls to form a closed chamber the walls of which can be inflated by the air under pressure. When the air under pressure has inflated the tube to the desired diameter, the nozzle is moved to the second position in which it is retained during further operation of the installation when it serves to cool the wall of the expanded tube. A nozzle is disclosed which is provided with an air-pervious diaphragm which adapts itself to the shape of the wall of the expanded tube and allows the best possible aerodynamic conditions for the creation of a film of air between the diaphragm and the expanded tube to be obtained.

14 Claims, 4 Drawing Figures

3,810,725

APPARATUS FOR USE IN THE MANUFACTURE OF A TUBULAR FILM FROM PLASTIC MATERIAL

BACKGROUND TO THE INVENTION

In the manufacture of a synthetic plastic film, a plastic tube is first extruded under pressure with the aid of a vertical die, the tube is cooled as it emerges from the die, and is then inflated by passage through a blowing annulus to produce the desired film thickness. The temperature of the expanded tube is then too high to allow it to be flattened, and it is necessary for pressure rollers for flattening the expanded tube to be located a predetermined distance from the outlet of the die. The expanded tube then ascends vertically approximately 6 to 12 metres, in what is called a "cooling tower" at the apex of which the expanded tube is flattened before being wound. The distance by which the expanded tube ascends before being flattened depends for example, on the equipment employed, the material extruded, the diameter of the expanded tube and the supply rate of the die.

It has already been proposed to accelerate the cooling of the expanded tube by introducing cooling air into the interior thereof through a tube extending through the die and extending downstream of the latter to a point just below the position at which flattening of the expanded tube is effected. The air flows out from the end of the tube and descends though the expanded tube formed of synthetic plastic material, being heated as it makes contact with the wall of the expanded film. The efficiency of such a procedure is extremely low due to the low velocity of the air contacting the wall of the expanded film.

In order to improve the efficiency of this procedure, it has been proposed to dispose in the expanded tube, an inner tube which is open at two ends and encloses a heat exchanger having a water circuit, fed through the die. A fan is disposed at the upper end of the inner tube and serves to circulate the air, drawing it through the inner tube where it is cooled by the heat exchange, before being allowed to descend between the inner tube and the expanded tube which it cools. This solution is more effective than the simple cooling method mentioned previously.

However, the bulk of the cooling system which is located within the expanded tube is relatively large. The introduction of water into the expanded tube through the die involves thermal problems. Taking into account the complexity of the installation, the efficiency thereof is still relatively low.

It has also been proposed to cool the tube at the outlet of the die or during the radial extension thereof, consecutive to inflation, by laterally projecting cooling air against the inner surface of the tube as the latter is displaced coaxially of the extrusion axis. The cooling air, in effect, acts as a blowing agent for expanding the tube and the use of a blowing annulus can be dispensed with. However, owing to the radial extension of the tube, the supply orifices of the cooling air supply device are located at a fixed distance from the wall of the tube, opposite the portion thereof which is undergoing expansion, i.e., at a location before that at which the tube has attained its final diameter. Such a cooling device does not cool the tube in the portion wherein it has attained its maximum diameter.

SUMMARY OF THE INVENTION

In a process for the manufacture of a tubular film from synthetic plastic material, comprising the steps of extruding a tube of said material through an annular die, cooling said tube at the outlet from said die, bringing together the walls of the said tube at a predetermined distance from said annular die so as to afford a sealed compartment, and introducing into the said sealed compartment a pressure fluid for radially expanding the said tube to a predetermined diameter, an improvement comprises directing at least a portion of said pressure fluid against the wall of the tube which is being axially displaced at a location at which it possesses its maximum diameter in the expanded state.

According to one aspect of the present invention, there is provided an installation for use in the manufacture of a tubular film from synthetic plastic material, comprising a die having members defining therebetween an annular orifice for forming a tube of said material, means spaced apart from said die for flattening said tube, means for feeding said die with a molten mass of said material, at least one tubular conduit means one end of which projects forwardly of the die and coaxially with the extrusion axis thereof and the opposite end of which is connected to a source of pressure fluid the purpose of which is to expand the tube to a tubular film of predetermined thickness and diameter, which projecting portion of the said conduit carries a device for the lateral distribution of the said fluid located at such a distance from the die that said tube is fully expanded as it passes thereover, in use, said distribution device comprising at least one nozzle for directing a supply of fluid towards said tube, an extensible conduit communicating at one end with an axial passage within the projecting portion of said conduit and at the other end with said nozzle, means for securing said nozzle on the said projecting portion of said conduit, permitting said nozzle to be in at least a first withdrawn position permitting the unhindered passage thereover of said tube as produced by the die, and in at least a second position wherein said nozzle is disposed near said tube as expanded, and means for displacing said nozzle from the first into the second of the said positions and vice versa.

OBJECTS OF THE INVENTION

A particular object of the present invention is to provide for the cooling efficiency of a tubular film extruded and expanded as aforesaid to be improved so that a reduction in the height of the cooling tower employed can be achieved for a particular delivery rate to the tower in prior art procedures or for an increase in said delivery rate to be achieved for the same height of cooling tower employed in prior art procedures. Further objects and advantages of the present invention will become apparent from the following detailed description read in the light of the accompanying drawings.

DESCRIPTION OF THE PREFERRED EMBODIMENTS

Figure 1:
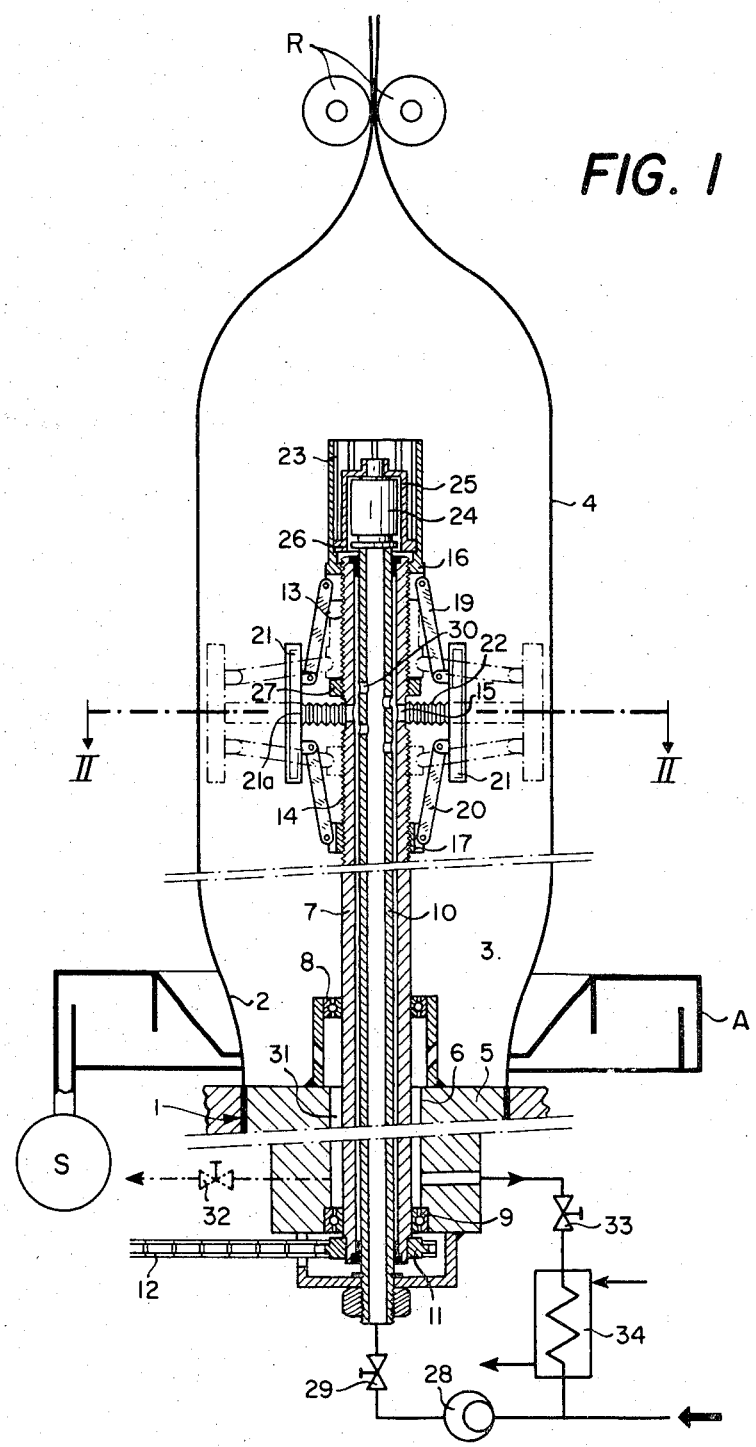
FIG. 1 is a view in partial section of one form of installation embodying the present invention.

FIG. 1 of the drawings shows the parts which are located at the ends of a head (not shown) for the extrusion of a synthetic plastic tube. Such a head comprises a die which can be of the radial or lateral feed type the longitudinal axis of which is at right angles to the axis of an extrusion worm which supplies the plastic material under pressure, to an extrusion duct of annular section of the die at a location upstream of the cavity located between the die and a plunger for forcing the plastic material out of the spinneret.

The only portion of the die shown in FIG. 1 is the extrusion orifice situated at the outlet of the extrusion duct of annular section of the die and given the reference numeral 1. A tube 2 of synthetic plastic material is produced at the orifice 1 which passes into a blowing zone 3 in which the tube is radially expanded so as to form an expanded section or "bottle" 4 of the desired diameter, in which the wall thickness of the tube possesses the desired film thickness. After flattening the walls of the "bottle" between two rolls R, known as "duck's bill" rolls, the flattened film is wound on a storage reel (not shown). A blowing annulus A connected to a source of pressure air S is disposed around the tube 2 at the outlet of the die.

The extrusion orifice 1 is defined internally by a block 5 which has an axial aperture 6 through which extends, with a radial clearance, a tubular shaft 7. The latter is mounted for rotation in two bearings 8 and 9 located respectively at the two longitudinal ends of the die. A fixed tubular conduit 10 is mounted coaxially with respect to the interior of the tubular shaft 7. Mounted on the lower end of the shaft 7 is a pinion 11 meshing with a chain 12 connected to a drive motor (not shown). The tubular shaft 7 projects at its upper portion externally of the die to a location in the vicinity of the upper end of the "bottle" 4.

The shaft 7 extends coaxially with the extrusion axis of the die. On the outer face of its projecting portion, the shaft 7 is provided with screwthreaded sections 13 and 14 of identical pitch but of opposite turn. The wall of the tubular shaft 7 is formed with four apertures 15 which are located opposite each other in pairs, and are arranged between the screwthreaded sections 13 and 14. Two threaded rings 16 and 17 engage respectively with the first and with the second screwthreaded sections 13 and 14. A head disposed about the tubular shaft 7, and which is shown in section in FIG. 2 has four nozzles 21 arranged substantially at the level of the screwthreads 13 and 14 in diametrically opposite positions pairwise. Each of the nozzles 21 is constituted by a compartment the wall of which remote from the shaft 7 is formed with perforations and the wall of which nearest to the shaft 7 is formed with an aperture 21a. The aperture 21a to each nozzle is connected to one of the apertures 15 formed in the tubular shaft 7 via an extensible conduit 22 constituted, for example, by a flexible tube having an undulating or corrugated wall. Each nozzle 21 is made fast with the screwthreaded rings 16 and 17 by two levers 19 and 20 respectively secured in articulated manner to the said rings at one end and to the associated nozzle at the other. An independent adjusting ring 27 is screwed on the screwthreaded section 13 of the tubular shaft 7.

The screwthreaded ring 16 is integral with a sleeve 23 which is internally splined and extends beyond the end of the tubular shaft 7. The free end of the tubular conduit 10 carries an electric motor 24 which is fed with current through a line (not shown) extending into the interior of the shaft 7 and which has an output shaft which carries a bell-shaped member 25. The base of the skirt of the bell-shaped member has a channelled or corrugated flange 26 which engages with the splines of the sleeve 23.

The lower end of the tubular rod 10 is connected to a source of pressure air constituted by a blower, for example a centrifugal fan 28, through a regulating valve 29. The tubular conduit 10 feeds nozzles 21 with pressure air through apertures 30 formed in its wall which communicate with the extensible conduits 22 previously mentioned through the apertures 15.

An annular escape conduit 31 for the air passes axially through the block 5 of the die. The inlet to the conduit 31 is located at the forward end of the die. Its outlet may either communicate with the atmosphere through an adjustable outlet valve 32 or with a cooling circuit which comprises an adjustable outlet valve 33 and a heat exchanger 34 the outlet of which is connected to the inlet to the centrifugal fan or blower 28.

Figure 2:
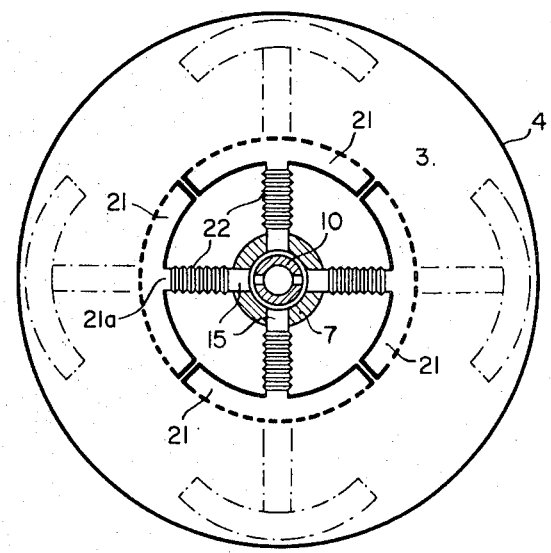
FIG. 2 is a view in section taken along the line II—II of FIG. 1.

The installation shown in FIGS. 1 and 2 is operated as follows. A tube 2 of plastic material is first extruded from the orifice 1 of the die. The tube is externally cooled on emerging from the die in conventional manner, with the aid of the blowing annulus A or any other equivalent means. The tube is then passed over the cooling nozzles 21 which are then in the withdrawn position shown in solid lines in FIGS. 1 and 2.

The wall of the tube is then nipped between the rolls R located at a predetermined distance upstream of the sleeve 23, to form a closed compartment within the tube. Pressure air is then introduced into the space within the tube 2 between the die and the rolls R via the nozzles 21, so as to inflate the tube. The thickness of the wall of the tube is reduced as the tube is radially expanded until the wall thickness of the tube corresponds to the desired film thickness. The shape of the expanded tube can then be likened to the shape of a bottle.

The outlet valve 33 is left closed until the pressure within the "bottle" has risen to a predetermined value or, if preferred, until the diameter of the "bottle" has reached a predetermined value. When the desired pressure has been attained, it is kept constant by means of the valves 33 and 29, regulating respectively the air discharge and the air feed.

When the tube being extruded first attains the desired diameter, the motor 24 is started up. Since the ring 16 is fast or integral with the sleeve 23 which is connected to the levers 19 and 20 and hence the nozzles 21 and the ring 17, the rings 16 and 17 are driven in the same direction about their associated screwthreaded sections 13 and 14. Since the said screwthreaded sections are of opposite turn, the rings are displaced in the opposite direction relative to each other along the shaft 7.

On putting the extrusion head into operation, the direction of such rotation will be selected in such manner that the rings 16 and 17 approach each other. The result of such approach of the rings if that the angle of the levers 19 and 20 to the horizontal is reduced as they rotate. Since the pitches of the two screwthreaded sections are identical, the angular displacement of all the levers is the same, so that the nozzles 21 approach the "bottle" 4 while remaining parallel to the axis of the shaft 7. The stop ring 27 limits the spacing of the nozzles from the shaft 7. The "in-use" position of the nozzles is shown in broken lines in FIGS. 1 and 2. In this position, the minimum space between the nozzles and the inner wall of the "bottle" is of the order of 0.3 mm.

When the nozzles are in this operative position, the tubular shaft 7 is rotated by a motor (not shown). The shaft 7 transmits to the nozzles 21 a planetary movement about the longitudinal axis thereof. As a result of this movement, jets of air emitted through the perforations in the nozzles 21 sweep a section of the inner wall of the "bottle" 4 as the tube 2 is being extruded and drawn by the flattening rolls R.

The regulating ring 27 screwed on the screwthreaded section 13 makes it possible to place the cooling nozzles into a position near the inner walls of "bottles" of varying diameter.

Figure 3:
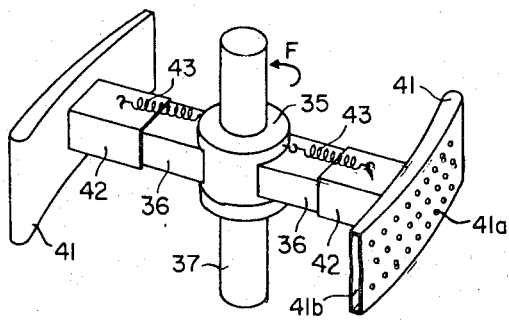
FIG. 3 is a perspective view of apparatus for use in a second form of installation embodying the present invention.
Figure 4:
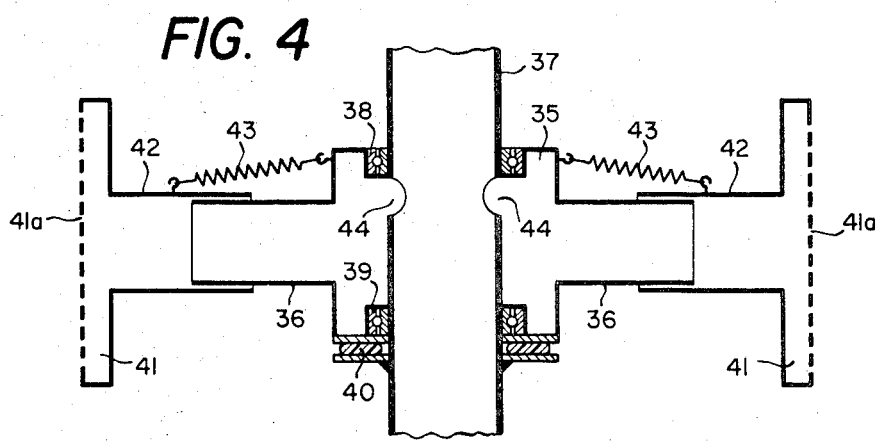
FIG. 4 is a diametral section through the apparatus of FIG. 3.

Referring next to FIGS. 3 and 4, there is shown diagrammatically a rotary cooling device for use in an expanded tube section or "bottle" and which comprises a boss or hub 35 the interior of which has the shape of an annular seat. Two tubular conduits 36, which are diametrically opposite, project radially from the boss or hub 35 which is mounted for rotation by means of two bearings 38 and 39 and a thrust bearing 40 about a fixed tubular conduit 37 extending through the die coaxially with the longitudinal axis thereof and affording an air supply conduit. The wall of the conduit 37 is formed with at least one aperture 44 located at the level of the boss 35. The said aperture 44 establishes communication between the inner space of the tubular conduit 37 and the annular seat of the hub 35.

Each tubular conduit 37 is telescopically engaged in one end of a tubular conduit 42 which is connected by a spring 43 to the boss 35. The other end of each conduit 42 opens into the nozzle 41 constituted by a compartment which is fast therewith. The wall of each nozzle 41 remote from the conduit 37 is convex and is formed with perforations 41a. A slot 41b is formed in one end wall of the compartment 41, the slot opening being radially disposed with respect to the axis of the tubular conduit 37.

The supplying of the nozzles with pressure air and also the air cooling circuit and the inlet and outlet regulating valves are in every way similar to that described with reference to the installation shown in FIGS. 1 and 2.

Prior to introduction of cooling air into the conduit 42, the spring will be untensioned and the compartment 41 will be spaced apart from the wall of the expanded tube passed thereover. Passage of the air will cause the compartment 41 to be displaced towards the wall of the expanded tube against the tension of the spring. The air pressure can be adjusted to provide the desired displacement of the compartment 41. When the pressure air is fed into the nozzle 41 through the conduit 42, it causes the compartment to rotate in the direction of the arrow F about the axis of the tubular conduit 37, escaping partially through the slot 41b. The remainder of the pressure air introduced into the compartment 41 flows out through perforations 41a, so as to cool the inner wall of the "bottle" which is formed therearound from the extruded tube as described in greater detail in connection with FIG. 1.

The operation of an installation equipped with the apparatus shown in FIGS. 3 and 4 differs from that described with regard to FIGS. 1 and 2 only in that regulation of the distance of the perforations 41a from the inner face of the "bottle" and also the bringing about of the planetary movement of the nozzles about the longitudinal axis of the conduit 37 are obtained automatically as a function of the pressure of the feed air supplied to the nozzles.

In a variant applicable to the two types of installation described hereinabove, the face of the nozzles 21 and 41 facing the film 4 may be constituted by a flexible diaphragm or membrane which may either be perforated or porous. The diaphragm is relaxed in the inoperative position of the nozzle. On feeding cooling air to the nozzle, the diaphragm is resiliently tensioned in the direction of the inner wall of the "bottle" 4.

An advantage of such a diaphragm is the ease with which it adapts itself to the shape of the wall of the "bottle" 4. Owing to this ease of adaptation, it is possible to achieve the best possible aerodynamic conditions for the creation of a film of air between the diaphragm and the film of synthetic plastic material forming the "bottle" 4. It is a known fact that in order to form an air film under good conditions, such a film should be formed between a flexible surface and a rigid surface. It may be considered here that the inner surface of the "bottle" subjected to the inflating pressure is a rigid surface, whereas the surface of the diaphragm is flexible.

In the two forms of air supply device described hereinabove, the radial mobility imparted to the nozzle permits initiation of the blowing operation. In fact, when not yet radially expanded, the extruded tube is able to pass about the nozzles when they are in the position in which they are radially nearest to the longitudinal axis of the sheath. The displacement of the nozzles radially outwardly is consecutive to the radial expansion of the tube to form the "bottle" the walls of which are constituted by the film which it is desired to produce.

The main advantage of the process described hereinabove resides in the fact that it permits a considerable improvement in the flow of heat from the "bottle," owing to the extremely high velocities at which the air is projected against the walls of the said "bottle," while at the same time maintaining reasonably low air supply rates.

Finally, it is pointed out that the number of nozzles is not critical. It need not be an even number. In each of the examples described, it would be possible to envisage a device comprising one, three or five nozzles, for example.

What is claimed is:

1. Installation for use in the manufacture of a tubular film from synthetic plastic material, comprising a die defining an annular orifice for forming a tube of said material, cooling means at the outlet of the die for cooling the tube of material, means spaced apart from said die for flattening said tube, means for feeding said die with a molten mass of said material, at least one tubular conduit means one end of which projects forwardly of the die and coaxially with the extrusion axis threof and the opposite end of which is connected to a source of pressure fluid the purpose of which is to expand the tube to a tubular film of predetermined thickness and diameter, and distribution means on the projecting portion of the said conduit for the lateral distribution of the said fluid and located at such a distance from the die that said tube is expanded as it passes thereover, in use, said distribution means comprising at least one nozzle for directing a supply of fluid towards said tube, and means supporting said nozzle for movement between a first withdrawn position permitting the unhindered passage thereover of said tube as produced by the die, and a second position in which said nozzle is disposed near said tube.

2. Installation according to claim 1 wherein said means supporting the nozzle comprises an extensible conduit communicating with an axial passage in the projecting portion of said conduit means for receiving pressure fluid.

3. Installation according to claim 1, wherein said nozzle securing means is supported for rotary movement about said tubular conduit means and is provided with means for driving the same in rotation about the said axis.

4. Installation according to claim 3, wherein said tubular conduit means is mounted for rotation on said die, being intended for connection to said source of pressure fluid at its end oppposite that carrying said nozzle, the said means for driving the nozzle securing means in rotation being located in the vicinity of the said opposite end.

5. Installation according to claim 3, wherein said nozzle securing means is constituted by a deformable structure permitting the location of said nozzle in said first position, in a first state of deformation of the structure, and in said second position in which projection of said fluid on the interior of said tube as expanded is effected, in a second deformation state of the structure.

6. Installation according to claim 3, wherein said nozzle supporting means comprises telescopically engaging tubes, an annular compartment supporting said tubes and mounted for rotation about said tubular conduit means and communicating with the latter, the said nozzle being so designed that a portion of the fluid flowing thereinto is directed in such a manner as to produce, by reaction, a couple about said tubular conduit, the said nozzle being further designed so that the remainder of the fluid supplied thereto is directed towards said tube to cool it, while maintaining said nozzle at a distance from said tube, which nozzle further comprises resilient biasing means tensioned between the free end of each telescopic tube and said annular compartment, said resilient biasing means being adapted to restore the said tubes into the withdrawn position when said fluid ceases to be supplied to said nozzle.

7. Installation according to claim 2, wherein said nozzle comprises a gas-permeable, flexible diaphragm disposed on support means to face said tube as expanded.

8. Installation for use in the manufacture of a tubular film from synthetic plastic material, comprising a die having members defining therebetween an annular orifice for forming a tube of said material, means spaced apart from said die for flattening said tube, means for feeding said die with a molten mass of said material, at least one tubular conduit means one end of which projects forwardly of the die and coaxially with the extrusion axis thereof and the opposite end of which is connected to a source of pressure fluid the purpose of which is to expand the tube to a tubular film of predetermined thickness and diameter, which projecting portion of the said conduit carries a device for the lateral distribution of the said fluid located at such a distance from the die that said tube is fully expanded as it passes thereover, in use, said distribution device comprising at least one nozzle for directing a supply of fluid towards said tube, an extensible conduit communicating at one end with an axial passage within the projecting portion of said conduit and at the other end with said nozzle, means for securing said nozzle on said projecting portion of said conduit comprising two limbs articulated on the one hand to fixed points on the nozzle and on the other hand to two associated support elements at least one of which is axially displaceable with respect to said tubular conduit, the four said points being located in a plane common to the longitudinal axis of said tubular conduit and external control means connected to the displaceable element for displacing it axially in such a manner as to displace the nozzle from at least a first withdrawn position permitting the unhindered passage thereover of said tube as produced by the die, to at least a second position wherein said nozzle is disposed near said tube as expanded.

9. Installation according to claim 8, wherein both said support elements are axially displaceable relatively to said tubular conduit, which support elements are constituted by screwthreaded rings engaging corresponding screwthreads formed on or around the projecting portion of said tubular conduit, the screwthreads associated with the respective support elements having the same pitch, but being of opposite turn, which installation further comprises a rotary motor fast with the end of said tubular conduit which projects forwardly of said die and drive means for transmitting the rotation produced by said motor to one of said threaded rings.

10. Installation according to claim 9, comprising a third threaded ring engaging with one of said corresponding screwthreads, said third ring being adapted to limit the axial displacement of said two rings to which said nozzle is connected.

11. Apparatus according to claim 8, wherein said nozzle securing means is adapted for rotary movement about said tubular conduit and is provided with means for driving the same in rotation about said tubular conduit.

12. Installation according to claim 11, wherein said means for effecting rotary movement of the nozzle means is mounted for rotation through the member defining the inner margin of said die, being intended to be connected to the said source of pressure fluid at its end opposite that carrying said nozzle, the said means for driving the nozzle securing means in rotation being located in the vicinity of the said opposite end.

13. Installation according to claim 8, wherein said nozzle securing means is constituted by a deformable structure permitting the location of said nozzle in said first position, in a first state of deformation of the structure, and in at least said second position in which projection of air on the interior of said tube as expanded is effected, in a second deformation state of the structure.

14. Installation according to claim 8, wherein said nozzle comprises a gas-permeable, flexible diaphragm disposed on support means to face said tube as expanded.

* * * * *